United States Patent
Zehfuss et al.

(10) Patent No.: US 9,517,787 B2
(45) Date of Patent: Dec. 13, 2016

(54) BABY STROLLER

(71) Applicant: Baby Jogger, LLC, Richmond, VA (US)

(72) Inventors: Mark Zehfuss, Glen Allen, VA (US); Jordi Dorca, Sant Joan de les Abadesses (ES)

(73) Assignee: Baby Jogger LLC, Richmond, VA (US)

( * ) Notice: Subject to any disclaimer, the term of this patent is extended or adjusted under 35 U.S.C. 154(b) by 0 days.

(21) Appl. No.: 14/825,547

(22) Filed: Aug. 13, 2015

(65) Prior Publication Data

US 2016/0046315 A1    Feb. 18, 2016

Related U.S. Application Data

(60) Provisional application No. 62/037,443, filed on Aug. 14, 2014.

(51) Int. Cl.
    *B62B 7/06*        (2006.01)
    *B62B 7/00*        (2006.01)

(52) U.S. Cl.
    CPC ............... *B62B 7/062* (2013.01); *B62B 7/008* (2013.01)

(58) Field of Classification Search
    CPC .............. B62B 7/062; B62B 7/00; B62B 7/12; B62B 7/14; B62B 7/142; B62B 9/10; B62B 9/12; B62B 9/28; B62B 2207/00; B62B 2207/02
    See application file for complete search history.

(56) References Cited

U.S. PATENT DOCUMENTS 1,269,379 A    6/1918    Burke
1,707,186 A    3/1929    Chatfield
(Continued)

FOREIGN PATENT DOCUMENTS

CN      2393775 Y      8/2000
EP      1153817 A1      11/2000
(Continued)

OTHER PUBLICATIONS

Prince Lionheart Stroller Connectors, Datasheet [online]. Sears Corporation, 2014 [retrieved on Dec. 10, 2015]. www.sears.com/quality-deals-prince-lionheart-stroller-connectors/p-SPM22236766921, pp. 1-2.
(Continued)

*Primary Examiner* — John Walters
*Assistant Examiner* — Brian Swenson
(74) *Attorney, Agent, or Firm* — Sutherland Asbill & Brennan LLP (57) ABSTRACT

Strollers are described that may be used as single strollers or may be reversibly connected together to form a double stroller. Strollers may comprise complementary connectors to be reversibly connected two single strollers in a side-by-side configuration with the rear wheels of the single strollers are interlocked to reduce the overall width of the double stroller. Further, single strollers may comprise complementary connectors to be reversibly connoted two single strollers in a train configuration with the front wheels of the single strollers interlocked to reduce the overall length of the double stroller. Additionally, single strollers may be produced with sets of connectors such that they may connected in either the side-by-side configuration or the train configuration.

18 Claims, 9 Drawing Sheets

(56) References Cited

U.S. PATENT DOCUMENTS

| | | |
|---|---|---|
| 1,890,469 A | 12/1932 | Powers |
| 3,053,493 A | 9/1962 | Stafford |
| 3,223,431 A | 12/1965 | Gottfried et al. |
| 3,612,603 A | 10/1971 | Snyder |
| 3,726,536 A | 4/1973 | Arino |
| 4,222,132 A | 9/1980 | Crim et al. |
| 4,349,938 A | 9/1982 | Fontana |
| 4,391,453 A | 7/1983 | Glaser |
| 4,403,807 A | 9/1983 | Wilkinson |
| 4,684,148 A | 8/1987 | Glaser |
| 4,725,071 A | 2/1988 | Shamie |
| D296,540 S | 7/1988 | Perego |
| 4,805,938 A | 2/1989 | Redmond et al. |
| D300,310 S | 3/1989 | Kassai |
| 4,834,415 A | 5/1989 | Yee |
| 4,834,452 A | 5/1989 | Goodrich |
| 4,858,947 A | 8/1989 | Yee et al. |
| 4,872,692 A | 10/1989 | Steenburg |
| D305,316 S | 1/1990 | Lin |
| 4,969,656 A | 11/1990 | Clausen |
| 5,018,754 A | 5/1991 | Cheng |
| 5,033,761 A | 7/1991 | Kelly |
| D321,850 S | 11/1991 | Mong-Hsing |
| 5,064,209 A | 11/1991 | Kurschat |
| D328,047 S | 7/1992 | Huang |
| 5,167,425 A | 12/1992 | Chen |
| 5,221,106 A | 6/1993 | Shamie |
| 5,230,523 A | 7/1993 | Wilhelm |
| D348,489 S | 7/1994 | Monneret |
| 5,338,096 A | 8/1994 | Huang |
| D360,392 S | 7/1995 | Lewandowski |
| D370,437 S | 6/1996 | Siesholtz |
| 5,522,121 A | 6/1996 | Fraynd et al. |
| D382,516 S | 8/1997 | Hutchinson |
| 5,653,460 A | 8/1997 | Fogarty |
| 5,664,795 A | 9/1997 | Haung |
| 5,772,235 A | 6/1998 | Espenshade |
| D404,344 S | 1/1999 | Espenshade et al. |
| 5,887,935 A | 3/1999 | Sack |
| 5,918,892 A | 7/1999 | Aaron et al. |
| 6,086,087 A | 7/2000 | Yang |
| 6,099,022 A | 8/2000 | Pring |
| D430,512 S | 9/2000 | Yang |
| D431,212 S | 9/2000 | Haung |
| 6,267,406 B1 | 8/2001 | Huang |
| D452,191 S | 12/2001 | Carpenter |
| 6,357,784 B1 | 3/2002 | Mitzman |
| 6,361,111 B1 | 3/2002 | Bowers et al. |
| 6,375,213 B1 | 4/2002 | Suzuki |
| 6,431,579 B1 | 8/2002 | Kaneko |
| 6,527,294 B1 | 3/2003 | Brewington et al. |
| 6,536,842 B2 | 3/2003 | Bowers et al. |
| 6,585,284 B2 | 7/2003 | Sweeney |
| 6,676,140 B1 | 1/2004 | Gondobintoro |
| 6,679,506 B2 | 1/2004 | Koppes |
| 6,752,405 B1 | 6/2004 | Wright |
| 6,843,498 B2 | 1/2005 | Bretschger |
| 6,935,652 B2 | 8/2005 | Fair |
| 6,938,906 B1 | 9/2005 | Black |
| 6,938,954 B1 | 9/2005 | Hendren et al. |
| 7,025,364 B1 | 4/2006 | Clarke |
| 7,364,183 B2 | 4/2008 | Lee |
| D568,794 S | 5/2008 | Siewertsen |
| 7,367,581 B2 | 5/2008 | Yang |
| 7,516,966 B2 | 4/2009 | Gray |
| D593,458 S | 6/2009 | Dong Xu |
| D595,621 S | 7/2009 | Ci Xiao |
| D598,333 S | 8/2009 | Li |
| 7,597,332 B2 | 10/2009 | Thompson |
| 7,896,384 B2* | 3/2011 | Schonfeld ............... B62B 7/12 280/47.38 |
| 8,128,103 B1 | 3/2012 | Schutzendorf et al. |
| 8,157,273 B2 | 4/2012 | Bar-Lev |
| 8,220,822 B2* | 7/2012 | Cohen ................... B62B 7/04 280/47.38 |
| 8,282,120 B2* | 10/2012 | Minato ................ B62B 7/062 280/47.38 |
| 8,297,642 B2* | 10/2012 | Tyson, III ............. A47C 1/14 280/643 |
| 8,398,143 B1 | 3/2013 | Haley |
| 8,905,427 B2* | 12/2014 | Katz ................ B60B 33/0002 280/47.38 |
| 2002/0158444 A1* | 10/2002 | DeTournay ........... B60D 1/155 280/491.2 |
| 2004/0251063 A1 | 12/2004 | Patterson et al. |
| 2007/0045975 A1 | 3/2007 | Yang |
| 2008/0122200 A1* | 5/2008 | Lake ..................... B62B 7/008 280/514 |
| 2008/0224451 A1* | 9/2008 | Vegt ..................... B62B 7/068 280/642 |
| 2009/0115151 A1 | 5/2009 | Van Dijk |
| 2009/0160162 A1 | 6/2009 | Bizzell |
| 2009/0289440 A1* | 11/2009 | Besikof ................. B62B 7/008 280/643 |
| 2010/0038887 A1 | 2/2010 | Bar-Lev |
| 2010/0140902 A1 | 6/2010 | Zehfuss |
| 2011/0175330 A1 | 7/2011 | Smith et al. |
| 2014/0265258 A1* | 9/2014 | Lalehzri ................ B62B 7/008 280/658 |

FOREIGN PATENT DOCUMENTS

| | | |
|---|---|---|
| EP | 1057709 A2 | 12/2000 |
| EP | 1190930 A2 | 3/2002 |
| EP | 1764282 A2 | 3/2007 |
| EP | 1935751 A2 | 6/2008 |
| GB | 2334010 A | 11/1999 |
| GB | 2368824 A | 5/2002 |
| GB | 2373484 A | 9/2002 |
| JP | 4232175 | 8/1992 |
| WO | 02/081287 A1 | 10/2002 |
| WO | 2005/021351 A2 | 3/2005 |
| WO | 2006/056795 A1 | 6/2006 |
| WO | 2007/033562 A1 | 3/2007 |
| WO | 2007/131222 A2 | 11/2007 |
| WO | 2008/013566 A1 | 1/2008 |
| WO | 2008/127128 A1 | 10/2008 |

OTHER PUBLICATIONS

International Search Report for Application No. PCT/US2015/045016 mailed Jan. 4, 2016, pp. 1-5.
Written Opinion for Application No. PCT/US2015/045016 mailed Jan. 4, 2016, pp. 1-6.

\* cited by examiner

BABY STROLLER

RELATED APPLICATIONS

This patent application claims priority under 35 U.S.C. §119 to U.S. Provisional Patent Application No. 62/037,443 filed on Aug. 14, 2014.

FIELD OF THE INVENTION

This invention is directed to a baby stroller that may be used as a single stroller or connected to a second stroller to be used as a double stroller. Embodiments of the stroller may be connected in a side-by-side configuration. Further embodiments of the stroller may be connected in a train configuration. Additional embodiments of the stroller may be selectively connected in a side-by-side configuration and/or a train configuration.

BACKGROUND

Double strollers, prams, and carriages (hereinafter referred to as "double strollers") for the transportation of multiple infants and/or small children are readily available. Various assemblies and designs have been developed for reversibly connecting two single strollers to produce a convertible double stroller. As used herein, "reversibly connect" or "reversibly attach" means the connection is not a permanent connection and that the connection is capable being of connected, disconnected, and reconnected by the user of the stroller without requiring special tools or special skills. Releasable connections include, but are not limited to, hooks, buttons, snaps, friction fittings, interference fits, threaded connections, locking tabs, keyed connections, pins and recesses, other hand operated fasteners, or the like.

Convertible double strollers may comprise connectors that may be used to reversibly connect two single strollers in train configuration or a side-by-side configuration. As used herein, a "train configuration" of a double stroller is a double stroller with the two stroller seats aligned as train cars are connected, wherein one seat follows behind the other in the direction of travel and a "side-by-side" configuration of a double stroller is a double stroller wherein the seats are next to each other and follow a parallel paths in the direction of travel. Typically, the location of the handle will indicate the direction of travel of the stroller as stroller handles are meant to be pushed from behind. Though other stroller designs are possible such as strollers with pull handles or connections to pull behind a bicycle.

Convertible double strollers allow the convenience of providing a choice of using the strollers as a double stroller only if desired and increasing the ease and safeness of maneuverability when transporting two small children. However, the conventional convertible double strollers are too wide in the side-by-side configuration and too long in the train configuration to be convenient.

There is a need for a convertible double stroller that may be connected in a train configuration such that the overall length of the double stroller is less than the length of a conventional convertible stroller in the train configuration. There is also a need for a convertible double stroller that may be connected in a side-by-side configuration such that the overall width of the double stroller is less than the width of a conventional convertible stroller in the side-by-side configuration.

SUMMARY

Convertible double strollers allow two single strollers to be reversibly connected together to form double stroller. In some Embodiments of the convertible double stroller may be reversibly connected in side-by-side configuration. In embodiments, the convertible double stroller may be configured from two single strollers wherein the two single stroller have frames that are substantially identical. In such embodiments, the two single strollers may be connected on either side of each other. In other embodiments, the two single strollers may be configured differently such that they may only be connected on one configuration, for example, one stroller may be connected only on the right side of the other stroller, not on the left.

In the side-by-side configuration, the single strollers are connected next to each other. In conventional convertible double strollers, the convertible double strollers is at least as wide as the two single strollers and typically wider due to the additional width of the connectors. In order to provide a convertible double stroller having an width that is less than the total width of the two single strollers, embodiments of the single strollers are designed to provide an overlapping or interlocking design such that the wheel of each stroller is placed within the footprint of the other single stroller and/or at least one wheel of each stroller is within the footprint of the stroller that is connected to it to form the convertible double stroller.

In one embodiment, a single stroller that may be connected to a second stroller has a baby stroller frame comprising a rear wheel support frame, wherein a second stroller connector is attached to an interior side of one of rear support frame. The second stroller connector is connected on an interior side of the first stroller. In one embodiment, the first stroller has an connector interior side of a rear wheel support frame or wheel support such that a rear wheel of the second stroller may be positioned adjacent to the rear wheel of the first stroller and between the two rear wheels and reversibly connected to the first stroller in this position. In such an embodiment, the footprint of the convertible double stroller is less than the total footprint of the two single strollers.

Conventional single strollers may not be connected together in this manner to produce a convertible double stroller as the tear wheel support frame interferes with interlocking the stroller frame and/or wheels of the second stroller. In one embodiment of a single stroller that may be reversibly connected to a second stroller to produce a convertible double stroller, the single stroller may comprise a rear support frame that is not symmetrical about the longitudinal center axis plane of the stroller. For example, an asymmetric frame allows a left rear wheel of one stroller to be secured in a space defined between a left rear wheel and a right rear wheel of a second single stroller. Additionally, the right rear wheel of the second stroller is secured in a space defined between the left rear wheel and the right rear wheel of the first stroller. In such embodiments, the rear wheels of both strollers may have substantially the same axis of rotation.

DESCRIPTION

Strollers are typically designed to push either one child (single stroller) or two children (double stroller). In some cases, connectors have been developed to attach two single strollers together to form a convertible double stroller. Convertible double strollers may comprise two single stroller that may be reversibly connected so the strollers may be used as single strollers or a double stroller, as desired.

Embodiments of the stroller are directed to strollers that may be connected together to form a double stroller. Embodiments of the convertible double stroller comprise two single strollers having complementary connectors that may be used to connect the two strollers together. For example, embodiments of the single strollers may be connected in the side-by-side configuration.

In other embodiments, the strollers may be connected in a front to front configuration to form a train configuration double stroller, in a specific embodiment; the strollers may be connected in an interlocked front to front configuration. An interlocked double stroller configuration is one wherein the one set of wheels, the front set of wheels or the rear set of wheels, of a first stroller is between the front and rear wheels of second stroller and a set of wheels of the second stroller are between the front and rear wheels of the first stroller, see FIG. 2 for example. In one embodiment, the stroller comprises at least one front connector at the front of the stroller. The front connectors may be attached anywhere on the front of the stroller such as on the swivel wheel supports, on the front wheel support frame, on the front wheel folding frame, or a combination of these locations, for example.

The front connectors may be connected to back connectors such that the front connectors on a first stroller connect to the back connectors on a second stroller. The back connectors are be complimentary to the front connectors that they will connect to. Complementary connectors are ones that may be mated to provide a secure connection.

Figure 1:
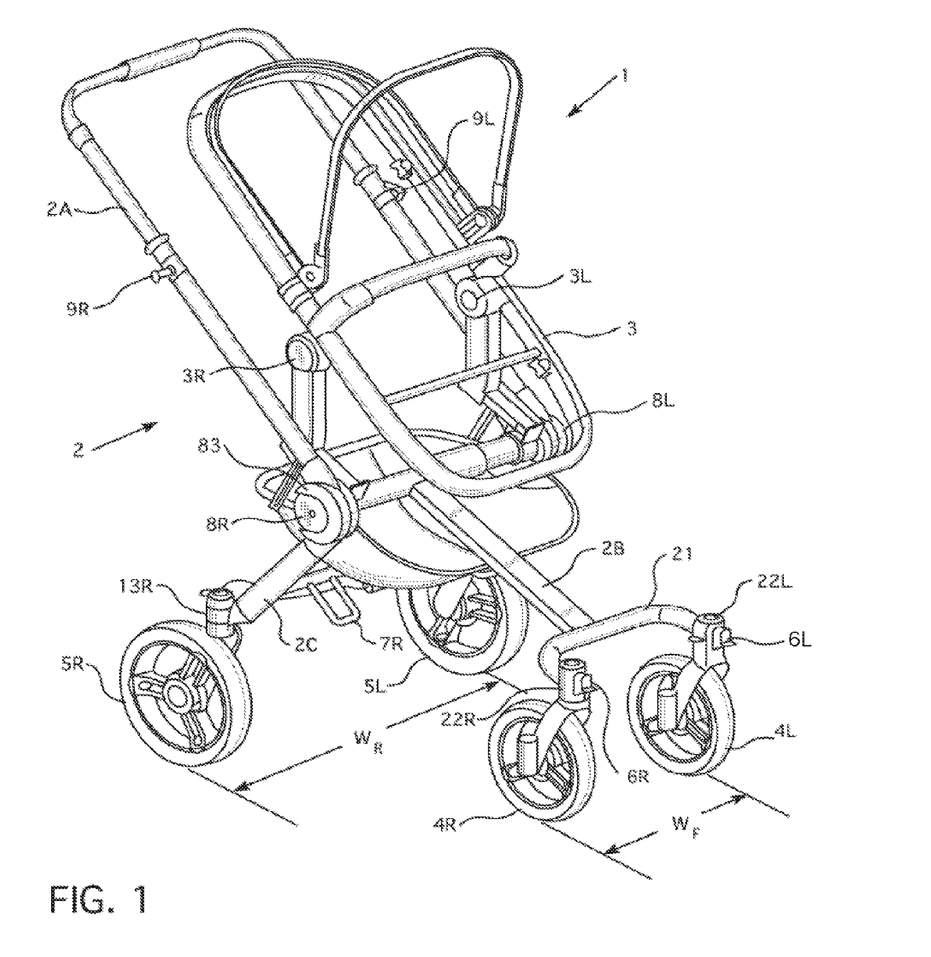
FIG. 1 depicts a perspective view of an embodiment of a single stroller that may be connected to a second single stroller to form a convertible double stroller in either side-by-side configuration and train configuration.
Figure 2:
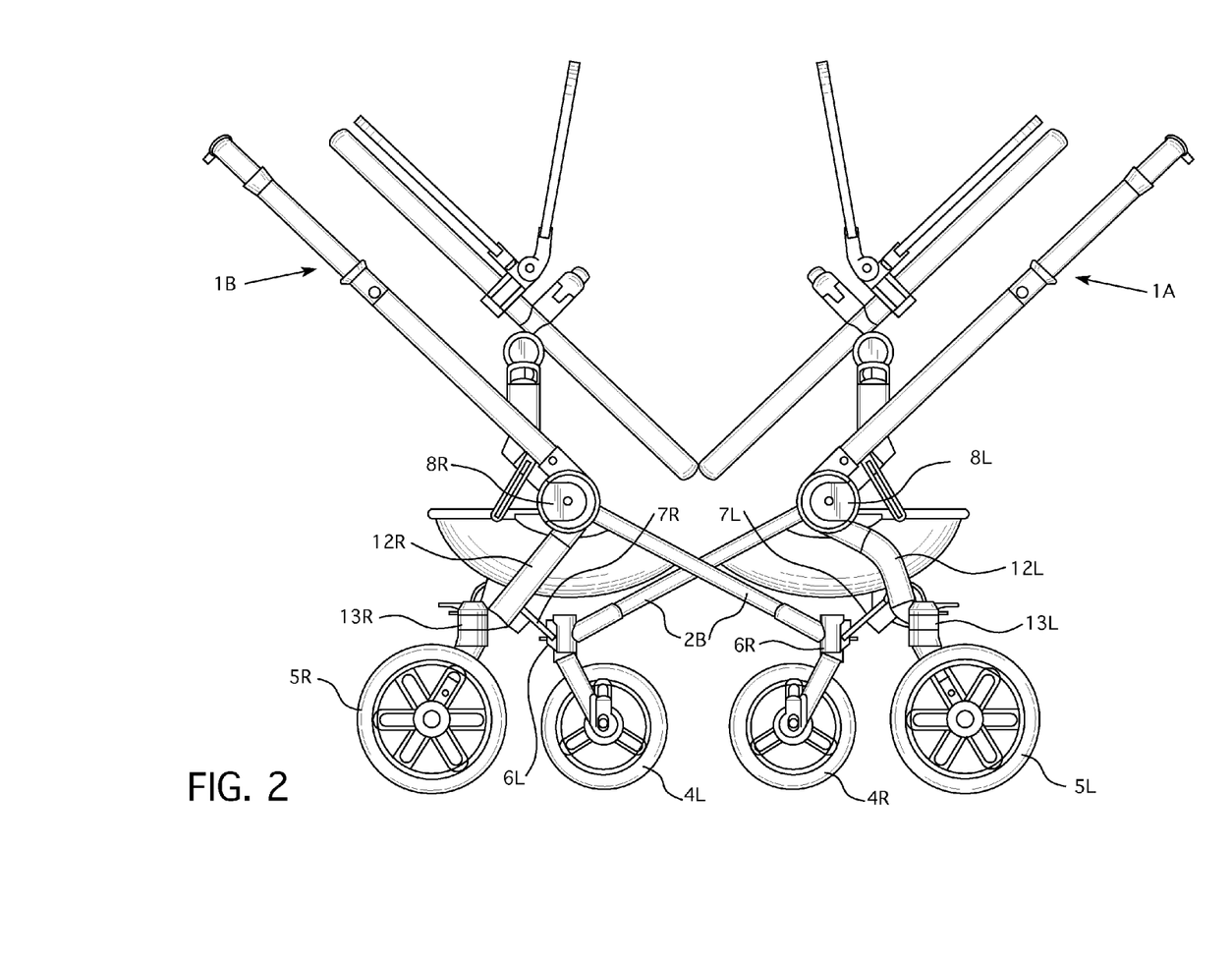
FIG. 2 depicts a side view of an embodiment of a convertible double stroller comprising the embodiment of the single stroller of FIG. 1 connected in the train configuration with a second stroller by connectors on the front wheel support frame of the second stroller connected to complementary connectors on the rear wheel support frame of the single stroller of FIG. 1.
Figure 3:
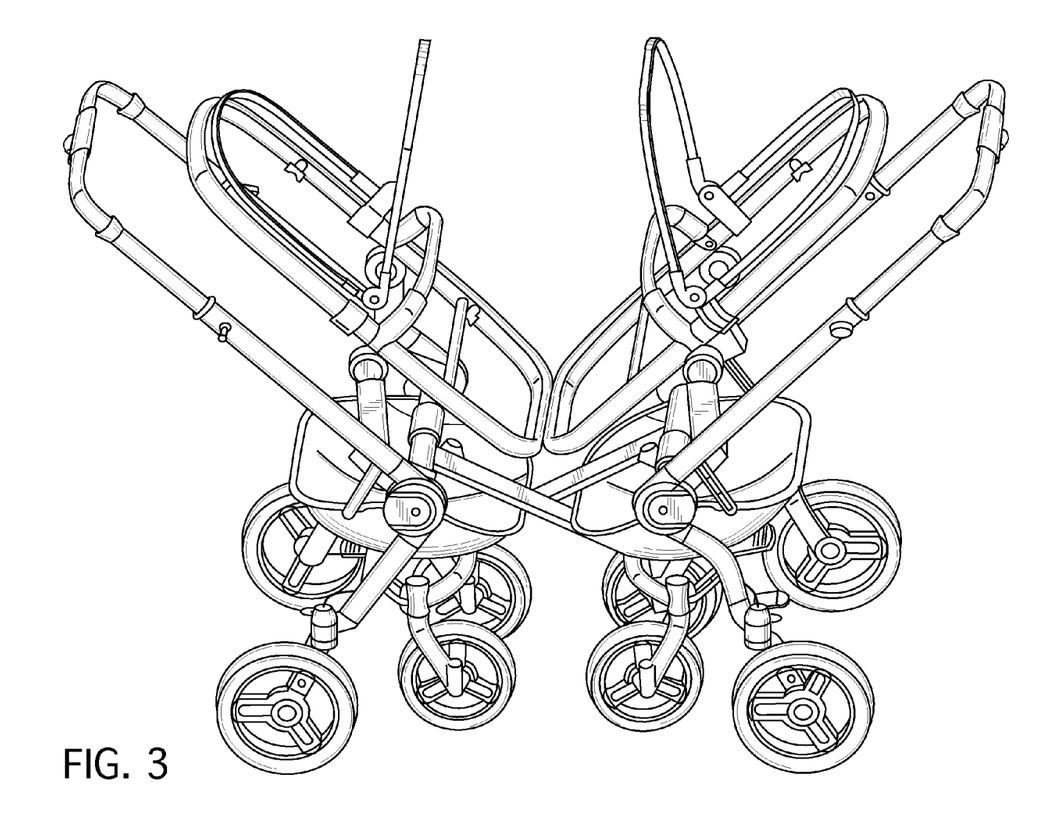
FIG. 3 depicts a perspective view of the embodiment of the convertible double stroller of FIG. 2.

An embodiment of a stroller that may be connected to a similar stroller is shown in FIG. 1. Two single strollers, such as the embodiment of the single stroller shown in FIG. 1, are depicted connected together in FIGS. 2, 3 and 4 to produce a convertible double stroller in the train configuration. It should be noted that the embodiment of the single strollers shown in FIGS. 1 through 4 comprise connectors for connecting the strollers in the train configuration and the side-by-side configuration, however, both sets of connectors are not necessary for embodiments of the strollers only intended for connection in the train configuration as shown in FIG. 2 or in the side-by-side configuration as shown in FIGS. 5 through 8.

In the embodiment of the stroller shown in FIG. 1, the stroller 1 comprises a stroller frame 2 and a stroller seat frame 3. The stroller seat frame 3 is releasably connected to a left seat connector 3L and a right seat connector 3R. In the embodiment shown, the seat 3 may be removed from the seat connectors 3L 3R and replaced in the forward facing position (shown) or the rearward facing position. The seat may also be removed and a car seat, bassinet or other baby carrier or seat may be connected to the seat connectors 3L 3R in place of the stroller seat frame 3.

The stroller frame 2 comprises a handle frame 2A. The handle frame 2A may be a U-shaped frame member as shown, two separate frame members as is known in the art or other handle design. The handle frame 2A may also include a folding joint or a telescoping section (not shown) to raise or lower the height of the handle portion for Use or storage.

Figure 4:
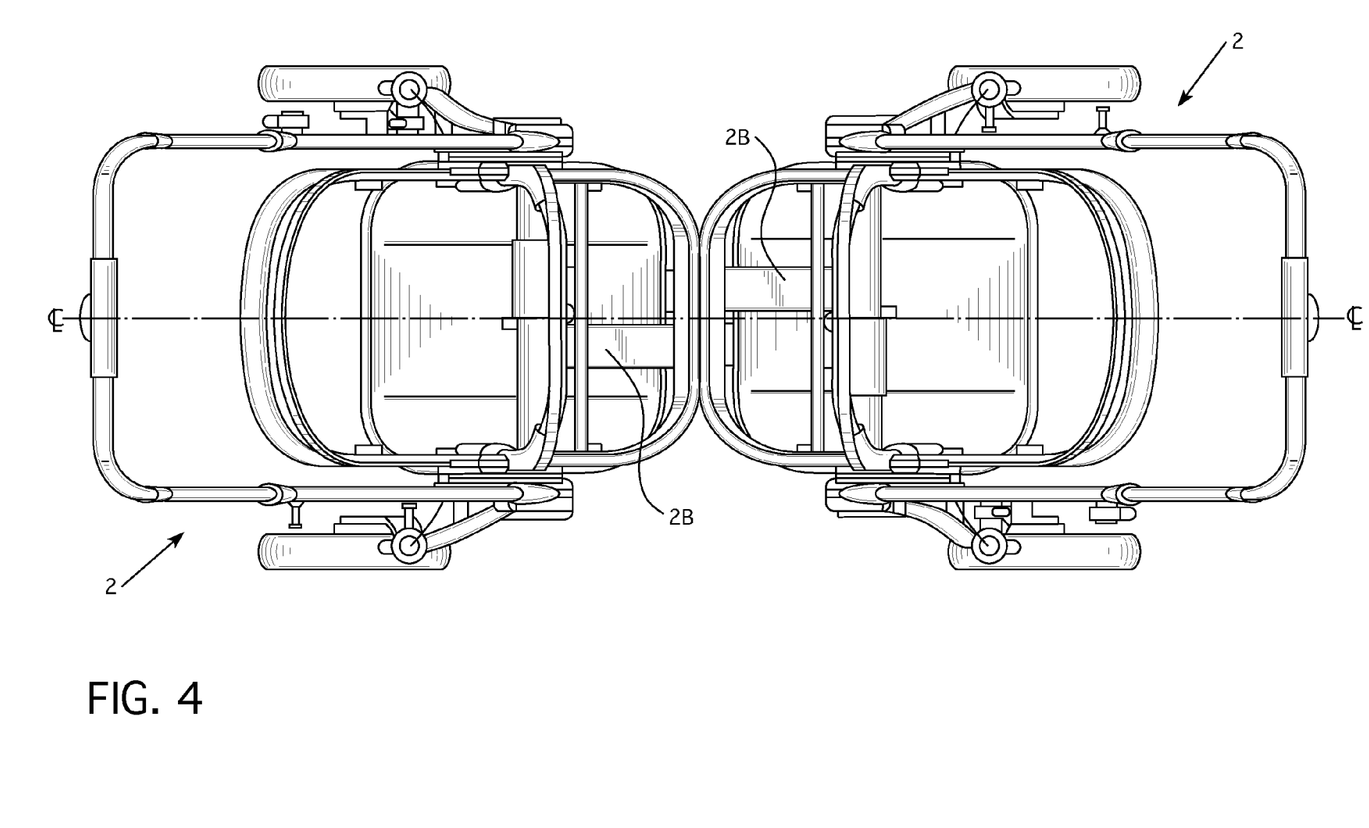
FIG. 4 depicts a top view of the embodiment of the convertible double stroller of FIG. 2 showing the center line of the convertible double stroller, the centerline is defined as a line from a midpoint between the rear wheels extending through a midpoint between the front wheels or center of the front wheel, the longitudinal center axis plane is a vertical plane extending through the center line of the stroller.

The stroller frame 2 also includes a front wheel support frame 2B. In the embodiment shown in FIG. 1, the front wheel support frame 2B comprises a front wheel support 21, a left swivel wheel support 22L, and a right swivel wheel support 22R. A set of front wheels include a left front wheel 4L and a right front wheel 4R are connected to the front wheel support frame 2B on a left swivel wheel support 22L and a right swivel wheel support 22R. As shown in FIG. 4, the front wheel support frame 2B of the embodiment of the stroller frame 2 is to the right of the center line of the stroller.

In the embodiment shown in FIGS. 1, 2, 3, and 4, a right front connecter 6R is connected on the front side of the right swivel wheel support 22R and a left front connector 6L is connected on the front side of the left swivel wheel support 22L.

The embodiment of the stroller frame 2 further comprises a rear wheel support frame 2C. The rear wheel support frame 2C comprises a rear support frame 11 (See FIG. 6, for example) extending between a left rear leg 12L and a right rear leg 12R. The rear support frame 11 comprises a left portion 11L and a right portion 11R. The rear wheel support frame 26 comprises rear connectors 7R 7L that are complementary to the front connectors. A left rear wheel 5L and a right rear wheel 5R are supported on the rear wheel support frame 2C on rear swivel wheel supports 13L 13R. In the embodiment shown in the Figure, the rear connectors 7L 7R comprise bars that may be sandwiched with the front connectors 6L 6R. Since the strollers are connected in a face to face orientation, the front connector 6L is complementary to rear connector 7R and front connector 6R is complementary to rear connector 7L.

As shown in Figures, the front connector 6L on a first stroller 1A is complementary to and can connect to the rear connector 7R on a second stroller 1B (shown) and right front connector 6R of the first stroller 1A is connected to the left rear connector 7L of the second stroller 1B (not shown). Similarly, right front connector 6R of the second stroller is connected to the left rear connector 7L of the first stroller (shown) and the front connector 6L on a second stroller 1B is complementary to and can connect to the rear connector 7R on a first stroller 1A (not shown). As such, the strollers may be compactly connected in a front wheel to back wheel and back wheel to front wheel train configuration. To accommodate the compact design the front frame 2B of at least one of the strollers 1A 1B may be located at a location off the center line (shown in FIG. 4) of the stroller so that the front frames 2B do not interfere as the strollers 1A 1B are connected. In the embodiment of the train configuration of stroller a shown in FIGS. 1 and 3, the width $W_F$ of the front wheels 4L 4R is less than the width $W_R$ of the rear wheels 5L 5R so that the front connectors 6R 6L on the front swivel wheel supports 22L 22R may connect directly with the rear connectors 7L 7R between the rear wheels 5L 5R.

In some embodiments, the front wheels of each of the strollers may be elevated above the floor when connected together so that the stroller is only rolling on the two rear wheels of each stroller. The double train configuration stroller as shown in FIG. 2 may now be pushed from either handle. In some embodiments, one or both handles may be removable such that one handle may be removed and the train configuration double stroller may be pushed from one end. Further, if desired, the seat of the second stroller 1B may be removed, rotated 180° and reconnected to the left and right seat connectors 3L 3R so that both stroller seat frames 3 are facing in the same direction (rearward if the handle of the second stroller 1B is used or forward if the handle of the first stroller 1A is used.).

The train configuration stroller is securely connected by four sets of complementary connectors; two in the front of each stroller to two in the rear of each stroller. The strollers may be connected such that the left front wheel 4L of the first stroller is adjacent the right rear wheel 5R of the second stroller and the right front wheel 4R of the first stroller is adjacent the left rear wheel 5L of the second stroller. Similarly, the left front wheel 4L of the second stroller is adjacent the right rear wheel 5R of the first stroller and the right front wheel 4R of the second stroller is adjacent the left rear wheel 5L of the first stroller.

The embodiments described above are for example only and to describe the invention. As such, other embodiments of strollers are also within the scope of the invention. For example, the two front connectors or two rear connectors may be replaced with a connector on the front wheel frame. In other embodiments of the stroller the front wheel frame may not offset from the center line as described but may include a notch that may be received within a notch on the front wheel frame of the second stroller. Such notches may include corresponding connectors to connect the strollers together by the front wheel support frame only or in combination with other connectors. The concept of the invention is to connect two strollers together such that the front wheels of the strollers are adjacent to the back wheels of the other stroller and vice versa. The front wheel support frame 2B may further comprise a connector that is reversibly connectible to a complementary connector on the front wheel support frame 2B of a second stroller.

As shown in Figures the front connectors 6R 6L are capable of clamping a rod of the rear connectors 7L 7R. Other connectors may be used to replace all or some of the described connectors. The connectors must be capable of securely connecting the strollers during use. For example, the strollers may comprise a pin as the front connector(s) and a recess as the rear connectors and a more secure connector such as a threaded connector may be used to connect the front wheel support frame such as a threaded connection.

In a second embodiment of a single stroller that may be converted into a double stroller, the two single strollers may be connected to produce a side-by-side configuration of a double stroller. For example, one embodiment of the convertible double stroller is shown in FIGS. 5, 6, 7A, 7B, 7C and 8. As used herein, the side-by-side stroller is one in which the seats travel in substantially parallel paths along the direction of travel during normal use.

The stroller in FIG. 1 may be used as a single stroller or connected to a similar stroller to form a double stroller in a side-by-side configuration. In the embodiment of the stroller shown in FIG. 1, the stroller 1 comprises a stroller frame 2 and a stroller seat frame 3. The stroller seat frame 3 is releasably connected to a left seat connector 3L and a right seat connector 3R.

The stroller frame 2 comprises a handle frame 2A. The handle frame 2A may be a U-shaped frame member as shown or two separate frame members as is known in the art. The handle frame may also include a folding joint or a telescoping section (not shown) to raise or lower the height of the handle portion for use or storage.

The stroller frame 2 also includes a front wheel support frame 2B. In this embodiment, the front wheel support frame comprises a front wheel support frame 21, a left swivel wheel support 22L, and a right swivel wheel support 22R. A left front wheel 4L and a right front wheel 4R are connected to the front wheel support frame 2B on the swivel wheel supports 22L 22R.

The stroller frame 2 further comprises a rear wheel support frame 2C. The rear wheel support frame 2C comprises a rear support frame 11. The rear support frame 11 comprises a left portion 11L and a right portion 11R. A left rear wheel 5L and a right rear wheel 5R are supported on the rear wheel support frame 2C. The rear support frame 11 of the embodiment in the figures is an asymmetric support frame. The left portion 11L is raised above the right portion 11R to accommodate location of the right rear wheel 11R of a second stroller between the right 5R and left rear wheels 5L of the first stroller. The raised left portion 11L and the arc portion 12L of the rear wheel support 2C provides an opening to allow the right rear wheel 5R of second stroller 1B to be positioned at the inside of the left rear wheel 5L of the first stroller 1B and under the left portion 11L of the rear support 11. This side-by-side interlocking configuration allows the two strollers to be more compactly connected.

Figure 5:
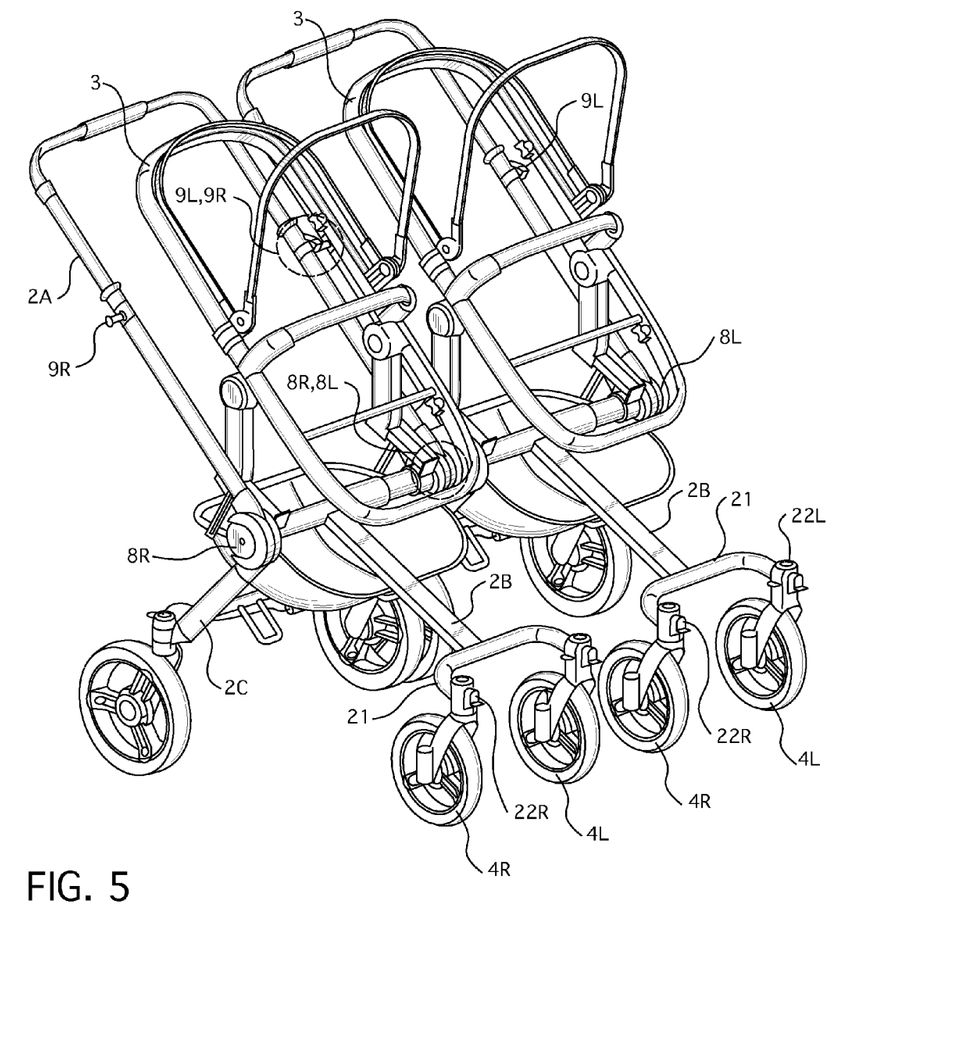
FIG. 5 depicts a perspective view of an embodiment of a convertible double stroller in the side-by-side configuration comprising the embodiment of the single stroller of FIG. 1 connected in the side-by-side configuration with a second stroller by connectors on the single stroller and complementary connectors on the second stroller on the folding mechanism housings, the Interior side of the rear wheel support frames, and the handle frames.

In the embodiment of the side-by-side configuration of stroller as shown in FIGS. 1 and 5, for example, the distance $W_R$ of the rear wheels 5L 5R determines the width of the stroller. In a typical convertible double stroller the width of the double stroller would be at least two times $W_R$. In addition to the width of the two strollers, the width of the conventional convertible double stroller also includes the width of the brackets used to connect the two single strollers. As can be seen in the embodiment Of the convertible double stroller of FIGS. 5 and 6, for example, the wheels of the single strollers are interlocked. Therefore, the width of the convertible double stroller is less than twice the width of the two single strollers.

Figure 6:
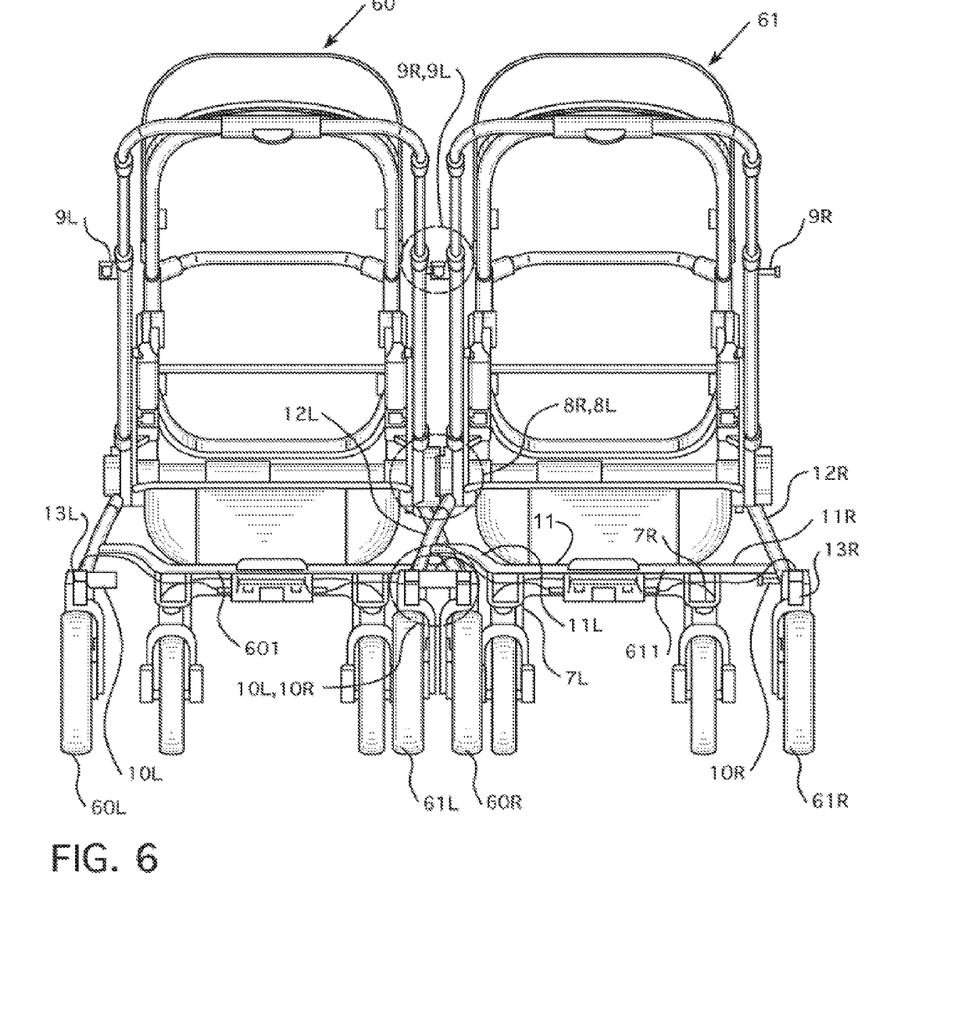
FIG. 6 depicts a rear view of the embodiment of the convertible double stroller of FIG. 5 clearly showing that the rear wheel support frame is asymmetric about the longitudinal center axis plane.

In one embodiment, the convertible double stroller comprises a first stroller 60 and a second stroller 61 as shown in FIG. 6. The first stroller 60 comprises a first left rear wheel having a first rotational axis and a first right rear wheel 60R having a second rotational axis. The first left rear wheel 60L and the first right rear wheel 60R define a first space under the first stroller 60 between the wheels 60R and 60L. Similarly, the second stroller 61 comprises a second left rear wheel 61L having a third rotational axis and a second right rear wheel 61R having a fourth rotational axis. Also similarly, the second left rear wheel 61L and the second right rear wheel 61R define a space under the second stroller 61 between the Wheels 61R and 61L. In the side-lay-side double stroller configuration, the second left rear wheel 61L is in the first space defined between the first left rear wheel 60L and the first right rear wheel 60R and the first right rear wheel 60R is in the second space defined between the second left rear wheel 61L and the second right rear wheel 61R. The resulting double stroller has the second left rear wheel 61L of the second stroller 61 to the left and adjacent to the first right rear wheel 60R of the first stroller 60. Due to the required interlocked rear wheels 60R 61L, the rear wheel support frames allow the wheels to be interlocked without interference of the frame structures. As shown in FIG. 6, the first rear wheel support structure 601 and the second rear wheel support structure 611 are similar comprising a left raised and more rearward left side and a straight and more forward right side. Thus, the right side of the rear wheel support structure of the first stroller may be moved backward under the left side of the rear wheel support structure of the second stroller. In other embodiments, one of the strollers may comprise both a left side and a right side having a raised and more rearward side and the other of the strollers may have a straight and more forward on both the left and right sides. The two strollers having such different and symmetric rear wheel support structures are still able to be connected on either side of each other.

For example, the embodiment of the single stroller frame 2 comprises a left rear wheel swivel supports 13L and a right rear wheel swivel support 13R. In the embodiment of the side-by-side double stroller configuration, the rear wheel swivel supports 13R 13L include a rear wheel connector 10R 10L on the inside portion or interior of the supports 10R 10L. The rear wheel connectors 10L 10R are directed to the interior so that when the rear wheel supports 13R 13L are interlocked in the side-by-side configuration, the connectors 10L 10R may be connected together secure the rear wheel frame 2C of each of the strollers together. In the embodiment shown, one rear wheel support 13R comprises connector 10R comprising a pin with a cap. The other rear wheel support 13L comprises a complementary clam shell connector 10L that is capable of clamping the pin within the clam shell when the clam shell is closed. In this embodiment, a rear portion of the clam shell connector comprises a tab that may be pressed to open the clam shell connector 10L to release the pin connector 10R from the connector 10L. Other complementary connectors may be used.

Figure 7A:
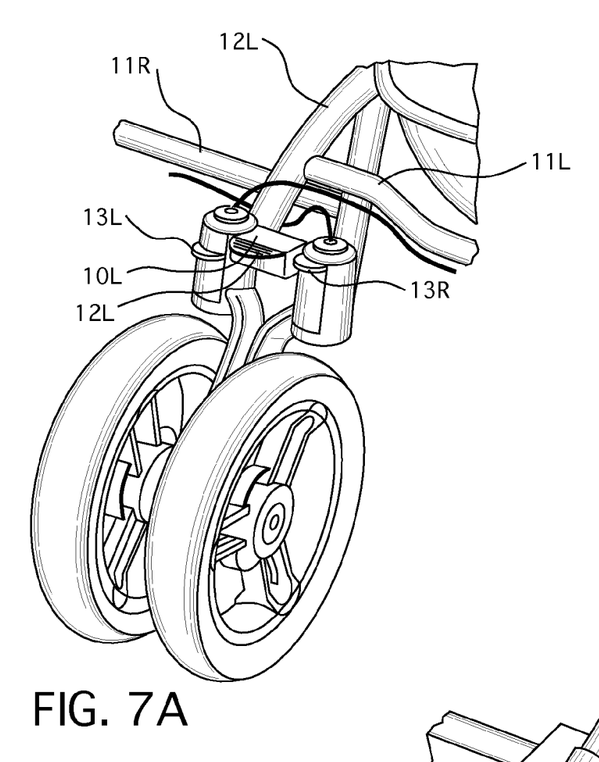
FIG. 7A depicts an enlarged view of the connection between the two strollers at the rear wheel of the embodiment of the convertible double stroller of FIG. 5.
Figure 7B:
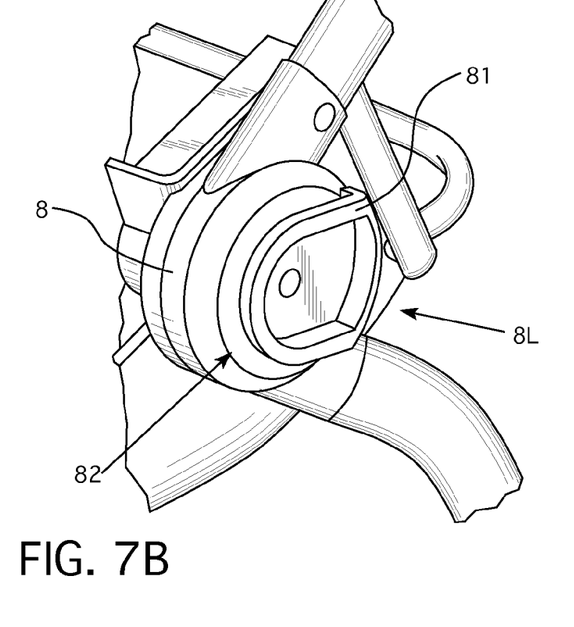
FIG. 7B depicts an enlarged view of the u-shaped connector on the housing of the folding mechanism of the embodiment of the single stroller of FIG. 1.

The embodiment of the stroller with connectors for forming a double stroller may comprise multiple complementary connectors. For example, the embodiment shown in the figures shows an interference connection between complementary left folding mechanism connector 8L and right folding mechanism connector 8R on the left and right folding mechanisms 8. The folding mechanisms 8 comprise a housing 8H encompassing the folding mechanism assembly. The housings on each side are formed with complementary connectors 8L 8R such that as the strollers are moved side-by-side the complementary folding mechanism connectors 8L 8R may be mated together. Folding mechanism connector 8L is shown in FIG. 7B. The left folding mechanism connector 8L comprises a U-shaped protrusion 81 with an outwardly projecting lip that forms a U-shaped slot 82. The right folding mechanism connector 8R, see FIG. 1, comprises a U-shaped protrusion 83 with an inwardly projecting lip that may be received with the U-shaped slot 82 to connect the two folding mechanism connectors 8L 8R.

Figure 7C:
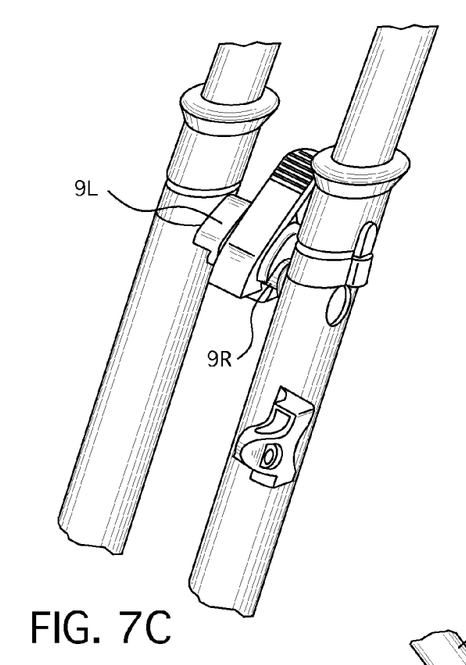
FIG. 7C depicts an enlarged view of the connection between the two strollers at the handle frame of the embodiment of the convertible double stroller of FIG. 5.
Figure 8:
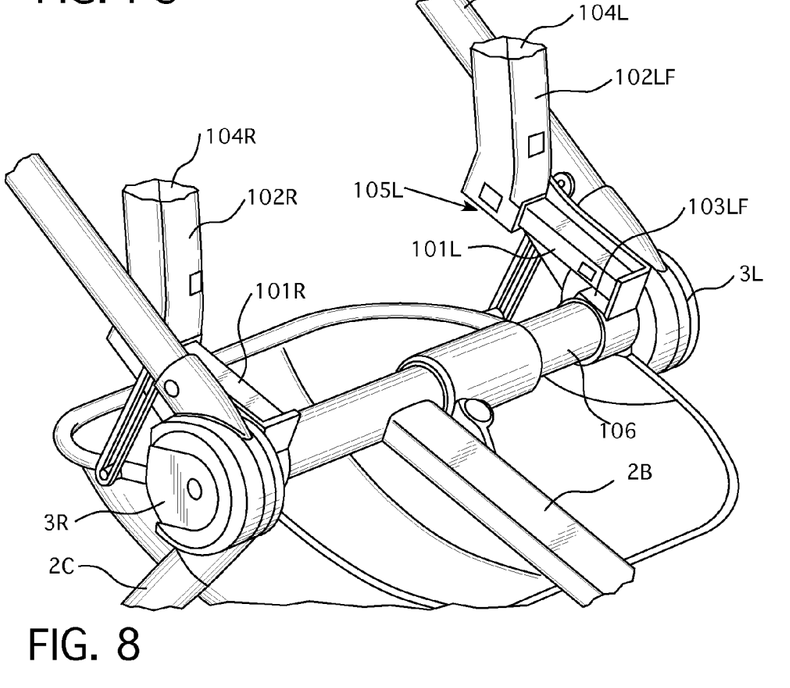
FIG. 8 depict an enlarged view of the folding mechanism and seat adjustment mechanism of an embodiment of a stroller.

The handle from may also comprise complementary connectors 9R 9L as shown in FIG. 7C. In the embodiment shown in the figures, the left handle connector is a clam shell connector 9L and the right handle connector 9R is a pin design similar to the rear wheel support connectors 10R 10L.

In this embodiment, the user may move the strollers in a side-by-side position with one stroller forward of the other stroller and meshed such that the rear wheels will interlock, as described above, when the strollers are aligned. The strollers may be moved such that the two folding mechanism connectors engage together, lip 83 within slot 82 and further push the folding mechanism connectors into place. Once the folding mechanism connectors 8L 8R are secure, the pins and the open clam shell connectors should be aligned and then the clam shell connectors may be closed to complete the connections for converting the two single strollers into a side-by-side stroller configuration. In some embodiments, the clam shell connectors are automatically closed as the pins are received within the open clam shell connectors.

The single strollers may be configured to be connected on only one side or have two sets of connectors so that the strollers may be connected on either side (as shown). For embodiments, wherein the strollers may be connected on either side, the complementary connectors are on each side of the stroller. For example, the handle connectors 9R 9L are both on each stroller. On other embodiments, the handle connector 9R is on a first stroller without a complementary handle connector 9L and the handle connector 9L is on a second stroller without a complementary handle connector 9R. In such embodiment, the first stroller may only be connected to the left of the second stroller to produce the side-by-side double stroller configuration. In embodiments, wherein both strollers comprise complementary connectors on both sides, the strollers may be conveniently connected together on either side.

In another embodiment, the single stroller comprises the described connectors to connect to a second stroller to produce both the side-by-side double stroller configuration and the train configuration. Such an embodiment is shown in FIG. 1 and the other figures.

A further embodiment of a stroller comprises a seat that may be repositioned. This embodiment may be desirable on a stroller that may be configured in a train configuration with a second stroller. A problem with two strollers being configured in a train configuration is that in the train configuration the strollers are too long to be easily maneuverable by a parent or guardian. Embodiments of the interlocking strollers described above solve the problem of the double stroller being too long to be manipulated by connecting the front of one stroller to the rear of the other stroller in a front to front interlocking relationship. In some embodiments of the two interlocking strollers, it may be desirable to have seats that may be repositioned or moved to provide an increased the distance between the seats or to move the center of gravity rearward.

Figure 9A:
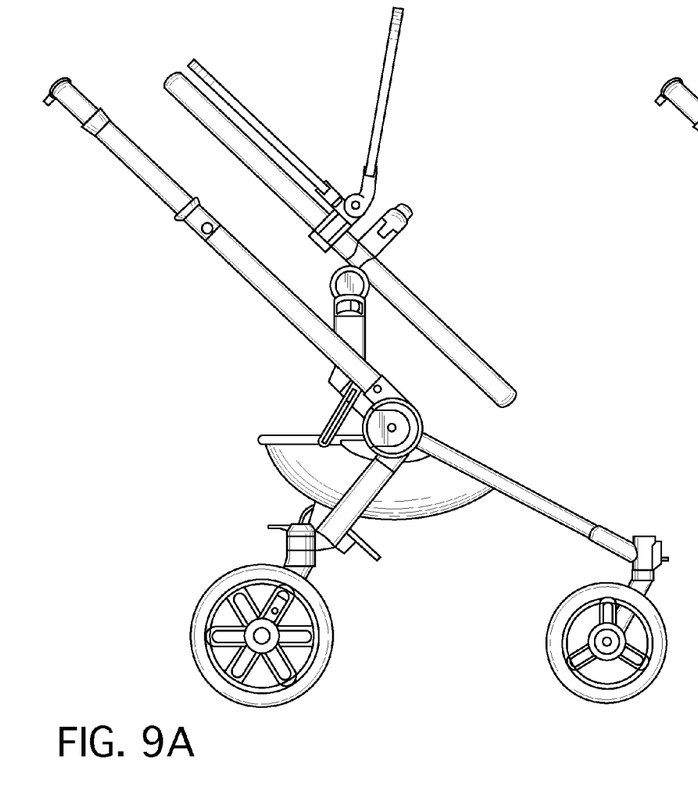
FIG. 9A and FIG. 9B depict two single strollers that may be connected to produce a convertible double stroller in either the side-by-side configuration or the train configuration.
Figure 9B:
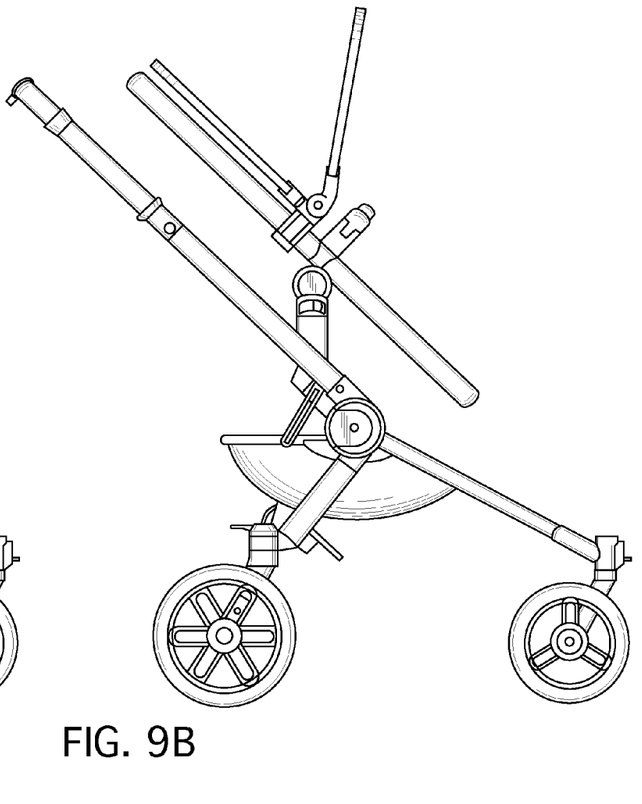

An embodiment of a seat repositioning mechanism is shown in FIG. 9. This embodiment comprises a left sliding rail 101L and a right sliding rail 101R connected to the stroller frame. In the embodiment shown in FIG. 9, the left 101L and right sliding rails 101R are part of the front wheel support frame 2B and connected to intermediate frame member 106. Left seat adapter 102L is slidingly connected to the left sliding rail 101L and right seat adapter 102R is slidingly connected to the right sliding rail 101R. The sliding rails 101L and 101R are received in a recess defined in the bottom portion of the seat adapters 102R and 102L. As such, the seat adapters 102R and 102L may be moved from a forward position typically used if the stroller is configured as a single stroller or a side-by-side configured double stroller) and a rearward position (typically used to add distance between the seats for a train configuration double stroller configuration). The seat repositioning mechanism may comprise more or less locations for securing the seat as desired. For example, there may be one or more intermediate positions for locating the seat adapters.

The sear repositioning mechanism may comprise a securing mechanism to secure the seat adapters at various locations along the sliding rails. For example as shown in FIG. 9, sliding rail 101L comprises a forward biased locking button 103LF a rearward biased locking button 103RL. A biased locking button may be received within a locking aperture 105L defined in the bottom portion of the seat adapter 102L, for example. The biased locking buttons may comprise a biasing member such as a spring or equivalent, for example, internal to the sliding rail 101L that biases the biased locking button outward. When a biased locking button is received within the locking aperture, the seat adapter may not be slid to another position on the sliding rail. To reposition the seat adapter, the biased locking button may be pressed to move the button further within the sliding rail to allow the seat adapter to be moved over and past the biased locking button to a new desired position. Other means of securing the seat adapter in a certain location may also be used, for example, set screws, pins, or other fasteners.

A stroller seat, car seat, bassinet or other seat may be connected between the seat adapters 102L and 102R. In some cases, the seat adapters may be removed and replaced with different seat adapters to accommodate seats with different connection types or different connection widths.

FIG. 10A depicts an embodiment of a stroller comprising seat repositioning mechanism with the seat adapter and seat secured in a forward position. FIG. 10B depicts an embodiment of a stroller comprising seat repositioning mechanism with the seat adapter and seat secured in a rearward position. FIG. 11 depicts two stroller comprising Seat repositioning mechanisms With the Seat adapter and seat secured in rearward positions to provide additional space between the seats to allow a face to face position of the seats on the double stroller in the train configuration.

Other embodiments of the seat repositioning mechanism may also be incorporated into embodiments of the stroller. For example, the seat adapters may be removably connected to the stroller frame comprising multiple seat adapter connectors. The seat adapters may be moved from one seat adapter connecter to another. In other embodiments the stroller frame may comprise a plurality of pairs of fixed seat adapters and the seat may be connected to any desired pair of seat connectors.

Other aspects and features of embodiments of the configurable strollers will become apparent to those of ordinary skill in the art, upon reviewing the following description of specific, exemplary embodiments of the present invention in concert with the figures. While features may be discussed relative to certain embodiments and figures, all embodiments can include one or more of the features discussed herein. While one or more particular embodiments may be discussed herein as having certain advantageous features, each of such features may also be integrated into various other of the embodiments of the invention (except to the extent that such integration is incompatible with other features thereof) discussed herein. In similar fashion, while exemplary embodiments may be discussed below as system or method embodiments it is to be understood that such exemplary embodiments can be implemented in various systems and methods.

The embodiments of the described methods and configurable strollers are not limited to the particular embodiments, method steps, and materials disclosed herein as such formulations process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

The invention claimed is:

1. A baby stroller frame, comprising:
   a rear wheel support frame, comprising:
     a left rear wheel;
     a right rear wheel;
     a rear wheel support structure;
     a left rear wheel swivel support and a right rear swivel support, each having a first end and a second end;
     wherein the first end of the left rear wheel swivel support is rotatably connected to the rear wheel support structure and the first end of the
     right rear wheel swivel support is rotatably connected to the rear wheel support structure;
     wherein the left rear wheel is rotatably connected to the second end of the left rear wheel swivel support and the right rear wheel is rotatably connected to the second end of the right rear wheel swivel support; and
   a second stroller rear wheel connector connected to an interior side of one of either the left rear wheel swivel support and the right rear wheel swivel support.

2. The baby stroller frame of claim 1, comprising:
   a handle frame;
   a front wheel support frame; and
   a folding mechanism rotatably connecting the rear wheel support frame, the front wheel support frame, and the handle frame, wherein the folding mechanism comprises a second stroller folding mechanism connector and the handle frame comprises a second stroller handle connector.

3. The baby stroller of claim 1, wherein the other of the left rear wheel swivel support and to the right rear wheel swivel support comprises a complementary second stroller rear wheel connector wherein the second stroller rear wheel connector is a complementary connector to the complementary second stroller rear wheel connector.

4. The baby stroller frame of claim 3, wherein the second stroller rear wheel connector and the complementary second stroller rear wheel connector are directed inward so the rear wheel support and a rear wheel support of a second stroller may be interlocked and connected in a side-by-side configuration.

5. The baby stroller frame of claim 4, wherein one of the second stroller rear wheel connector and the complementary second stroller rear wheel connector is a pin with a cap and the other of the second stroller rear wheel connector and the complementary second stroller rear wheel connector is a complementary clam shell connector that is capable of clamping the pin within the clam shell when the clam shell is closed.

6. The baby stroller frame of claim 5, wherein a rear portion of the clam shell connector comprises a tab that may be pressed to open the clam shell connector to release the pin connector from the clam shell connector.

7. A baby stroller frame, comprising:
a longitudinal center axis plane;
a front wheel support frame, wherein the front wheel support frame is not symmetrical about the longitudinal center axis plane; and
a rear wheel support frame, comprising;
a left rear wheel;
a right rear wheel;
a left rear wheel support, wherein the left rear wheel is rotatably connected to the left rear wheel support;
a right rear wheel support, wherein the right rear wheel is rotatably connected to the right rear wheel support, wherein the rear wheel support frame is not symmetrical about the longitudinal center axis plane.

8. The baby stroller of claim 7, wherein the left rear wheel support and the right rear wheel support are not symmetrical about the longitudinal center axis plane.

9. The baby stroller frame of claim 7, wherein the left rear wheel support has a different shape than the right rear wheel support.

10. A double stroller, comprising:
a first stroller, comprising:
a first left rear wheel having a first rotational axis;
a first right rear wheel having a second rotational axis; and
a first space defined between the first left rear wheel and the first right rear wheel;
a second stroller reversibly connected to the first stroller, comprising:
a second left rear wheel having a third rotational axis;
a second right rear wheel having a fourth rotational axis; and
a second space defined between the second left rear wheel and the second right rear wheel;
wherein the first left rear wheel is reversibly connected to the second right rear wheel and, when connected, the first left rear wheel is in the second space defined between the second left rear wheel and the second right rear wheel and the second right rear wheel is in the first space defined between the first left rear wheel and the first right rear wheel.

11. The double stroller of claim 10, wherein the first rotational axis, second rotational axis, the third rotational axis, and the fourth rotational axis are substantially co-linear.

12. The double stroller of claim 11, wherein the first left rear wheel and a first right rear wheel are supported on a first rear support frame and the first rear wheel support frame is asymmetric around a first longitudinal center axis plane of the first stroller.

13. The double stroller of claim 12, wherein the first rear support frame has a raised right portion and an arc portion defining an opening to allow the second right rear wheel of second stroller be positioned adjacent the first left rear wheel of the first stroller.

14. The double stroller of claim 13, wherein the second left rear wheel and a second right rear wheel are supported on a second rear support frame of the second stroller and the second rear wheel support frame is asymmetric around a longitudinal center axis plane of the second stroller.

15. The double stroller of claim 10, comprising:
a handle frame;
a left front wheel frame
a right front wheel frame; and
a folding mechanism rotatably connecting the left rear wheel support frame, the left front wheel frame, and the handle frame, wherein the folding mechanism comprises a second stroller folding mechanism connector and the handle frame comprises a second stroller handle connector.

16. A double stroller, comprising:
a first stroller comprising a first front wheel frame rotatably connected to a first front wheel and first rear wheel frame rotatable connected to two first rear wheels, wherein the first front wheel frame comprises a first front connector and the first rear wheel frame comprises a first rear connector;
a second stroller comprising a second front wheel frame rotatably connected to a second front wheel and second rear wheel frame rotatably connected to two second rear wheels; wherein the second front wheel frame comprises a second front connector the first rear wheel frame comprises a second rear connector, and the first front connector is reversibly connected to the second rear connector and the second front connector is reversibly connected to the first rear connector such that the first front wheel is in a space defined between the second front wheel and the second rear wheels.

17. The double stroller of claim 16, wherein the first baby stroller comprises a first longitudinal center axis plane and the first front wheel frame is not symmetrical about the longitudinal center axis plane.

18. The double stroller of claim 16, wherein the second baby stroller comprises a second longitudinal center axis plane and the second front wheel frame is not symmetrical about the second longitudinal center axis plane.

* * * * *